United States Patent Office 3,169,969
Patented Feb. 16, 1965

---

3,169,969
3-TRICHLOROMETHYLTHIO-5-HALO-1,3,4-THIADIAZOL-2-ONE
Jean Metivier, Choisy-le-Roi, and Roger Boesch, Vitry-sur-Seine, France, assignors to Rhone-Poulenc S.A., Paris, France, a French body corporate
No Drawing. Filed May 14, 1963, Ser. No. 280,425
Claims priority, application France, May 15, 1962, 897,582
2 Claims. (Cl. 260—306.7)

This invention relates to new thiadiazolone compounds having fungicidal properties, to a process for their preparation, and to compositions containing them.

According to the present invention, there are provided the new 3-trichloromethylthio-5-halogeno-1,3,4-thiadiazol-2-ones of the formula:

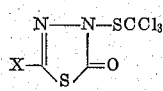

I wherein X represents a halogen atom.

According to a feature of the present invention, the compounds of Formula I are prepared by the process which comprises reacting perchloromethylmercaptan (ClSCCl₃) with a thiadiazolone of the formula:

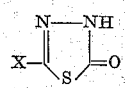

II wherein X is as hereinbefore defined, or an alkali metal derivative thereof. The reaction is carried out in water or in an inert organic solvent in the presence or absence of a condensing agent, preferably at a temperature between 0° C. and 50° C. As organic solvents there may be employed aromatic hydrocarbons, e.g. benzene or toluene, or aliphatic ketones, e.g. acetone. The preferred condensing agents are alkali metal derivatives such as hydroxides or carbonates.

The thiadiazolone compounds of Formula I possess fungicidal properties which are useful in agriculture; in particular, they are active against apple-scab, potato blight or tobacco mildew.

According to a further feature of the present invention, there are provided fungicidal compositions containing at least one thiadiazolone compound of Formula I in association with one or more diluents compatible with the thiadiazolone and suitable for use in agricultural fungicidal compositions. Preferably the compositions contain between 0.005 and 90% by weight of thiadiazolone. The compositions may be solid if there is employed a powdered solid compatible diluent such as talc, calcined magnesia, magnesium silicate, kieselguhr, tricalcium phosphate, powdered cork, absorbent charcoal, or a clay such as kaolin or bentonite. Instead of a solid diluent, there may be used a liquid in which the thiadiazolone is dissolved or dispersed. The compositions may thus take the form of suspensions, emulsions or solutions in organic or aqueous-organic media, for example aromatic hydrocarbons such as toluene or xylene or mineral, aminal or vegetable oils, or mixtures of these diluents. The compositions in the form of dispersions, solutions or emulsions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When desired, emulsions of the thiadiazolones may be used in the form of self-emulsifying concentrates containing the active substance dissolved in the dispersing agent or in a solvent containing a dispersing agent compatible with the active thiadiazolone and solvent, a simple addition of water producing compositions ready for use.

The solid compositions are preferably prepared by grinding the thiadiazolone with the solid diluent and optionally a wetting, dispersing or emulsifying agent, or by impregnating the solid diluent with a solution of the thiadiazolone in a volatile solvent, evaporating the solvent, and if necessary grinding the product so as to obtain a powder.

Fertilisers may be admixed with the aforesaid compositions.

For fungicidal purposes the active substances may be employed in dosages varying within relatively wide limits but dosages corresponding to a quantity of from 20 to 600 g. (preferably 100 to 200 g.) of active substance per hectare are generally suitable.

The following examples illustrate the invention.

*Example I*

Perchloromethylmercaptan (18.6 g.) is added, over about ten minutes, to a solution of 5-chloro-1,3,4-thiadiazol-2-one (13.65 g.) in N sodium hydroxide solution (100 cc.) cooled to 3° C. The precipitate formed is separated, washed with water and dried, giving 3-trichloromethylthio-5-chloro-1,3,4-thiadiazol-2-one (24.5 g.), M.P. 86° C. after recrystallisation from ethanol.

5-chloro-1,3,4-thiadiazol-2-one used as starting material is prepared according to Stolle and Fehrenbach, J. prakt. Chem., 122, 305 (1929).

*Example II*

A mixture of 3-trichloromethylthio-5-chloro-1,3,4-thiadiazol-2-one (5 parts), talc (4.5 parts) and a wetting agent obtained by the condensation of ethylene oxide (10 moles) and octylphenol (1 mole) (0.5 part) is finely ground in a mortar. The powder obtained may be used, after suspension in water so as to obtain 100 to 200 g. of thiadiazolone/hectolitre, to treat apple trees against scab.

The parts referred to are parts by weight.

According to another feature of the invention, a method for the treatment of plants or trees infected by fungi, or to prevent infection by fungi, comprises applying to the plants or trees a fungicidal composition containing at least one thiadiazolone compound of general Formula I. Apple trees, potato plants or tobacco plants may, for example, be treated to control, or prevent infection by, apple-scab, or potato blight or tobacco mildew, respectively.

We claim:
1. A compound of the formula:

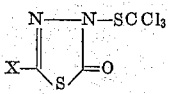

wherein X is halogen.
2. 3-trichloromethylthio-5-chloro-1,3,4-thiadiazol-2-one.

References Cited in the file of this patent
UNITED STATES PATENTS

| | | |
|---|---|---|
| 2,553,770 | Kittleson | May 22, 1951 |
| 2,553,775 | Hawley et al. | May 22, 1951 |
| 2,613,207 | Lo et al. | Oct. 7, 1952 |
| 2,702,803 | Ainsworth | Feb. 22, 1955 |
| 2,744,908 | Young | May 8, 1956 |
| 2,863,803 | Benghiat et al. | Dec. 9, 1958 |
| 3,090,721 | Uhlenbroek et al. | May 21, 1963 |